(12) United States Patent
Panitzki et al.

(10) Patent No.: US 10,976,230 B2
(45) Date of Patent: Apr. 13, 2021

(54) ROTATION VISCOSIMETER AND METHOD FOR DETERMINING THE VISCOSITY OF MATERIALS USING A ROTATION VISCOSIMETER

(71) Applicant: ANTON PAAR GMBH, Graz (AT)

(72) Inventors: Ulf Panitzki, Graz (AT); Peter Kraxner, Fernitz-Mellach (AT); Rudolf Reiter, Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 169 days.

(21) Appl. No.: 16/398,553

(22) Filed: Apr. 30, 2019

(65) Prior Publication Data

US 2019/0331576 A1    Oct. 31, 2019

(30) Foreign Application Priority Data

Apr. 30, 2018 (AT) .............................. A 50365/2018
May 4, 2018 (AT) .............................. A 50376/2018

(51) Int. Cl.
*G01N 11/14* (2006.01)

(52) U.S. Cl.
CPC ................................. *G01N 11/14* (2013.01)

(58) Field of Classification Search
CPC .... G01N 1/14; G01N 1/142; G01N 2011/145; G01N 2011/147; G01N 1/16; G01N 1/162; G01N 1/165; G01N 1/167
See application file for complete search history.

(56) References Cited

U.S. PATENT DOCUMENTS

| 3,875,791 | A | * | 4/1975 | Fitzgerald | .............. | G01N 11/14 |
| | | | | | | 73/54.31 |
| 4,299,119 | A | * | 11/1981 | Fitzgerald | .............. | G01N 11/14 |
| | | | | | | 73/54.28 |
| 4,484,468 | A | * | 11/1984 | Gau | ....................... | G01N 11/14 |
| | | | | | | 702/50 |

(Continued)

FOREIGN PATENT DOCUMENTS

| AT | 508705 B1 | 6/2011 |
| DE | 7918425 U1 | 11/1979 |

(Continued)

*Primary Examiner* — Justin N Olamit
(74) *Attorney, Agent, or Firm* — Laurence A. Greenberg; Werner H. Stemer; Ralph E. Locher

(57) ABSTRACT

A method for determining the viscosity of materials uses a rotation viscosimeter having a measuring shaft connected through a coupling element to a drive and a measuring element on a shaft end applied to a sample. An angle measuring unit measures an angle deflection between drive and shaft. The measuring element is immersed in a measuring container containing the sample. The rotational speed of the shaft increases from a first measuring point at an initial speed in steps to further measuring points and the angle deflection between the drive and the shaft is determined in the measuring points. An estimation function is determined for the rotational speed and the angle deflection for the sample using measured values in the measuring points. An optimum rotational speed is determined based on the estimation function of a previously defined optimum angle deflection and the viscosity measurement of the sample is carried out.

14 Claims, 3 Drawing Sheets

(56) References Cited

U.S. PATENT DOCUMENTS

| | | | |
|---|---|---|---|
| 5,287,732 A | 2/1994 | Sekiguchi | |
| 5,503,003 A | 4/1996 | Brookfield | |
| 5,777,212 A | 7/1998 | Sekiguchi et al. | |
| 7,207,210 B2 * | 4/2007 | Moonay | G01N 11/14 73/54.28 |
| 9,261,446 B2 | 2/2016 | Raffer | |

FOREIGN PATENT DOCUMENTS

| | | | |
|---|---|---|---|
| GB | 2204701 A | 11/1988 |
| WO | 9206365 A1 | 4/1992 |

* cited by examiner

ROTATION VISCOSIMETER AND METHOD FOR DETERMINING THE VISCOSITY OF MATERIALS USING A ROTATION VISCOSIMETER

CROSS-REFERENCE TO RELATED APPLICATION

This application claims the priority, under 35 U.S.C. § 119, of Austrian Patent Applications AT A50365/2018, filed Apr. 30, 2018 and AT A50376/2018, filed May 4, 2018; the prior applications are herewith incorporated by reference in their entireties.

BACKGROUND OF THE INVENTION

Field of the Invention

The invention relates to a method for determining the viscosity of materials using a rotation viscosimeter and to a rotation viscosimeter for measuring the viscosity of materials.

Rheometers and viscosimeters generally determine the flow properties of fluid media. In that case, precise boundaries between the terms viscosimeter and rheometer are not provided in the literature. In general, viscosimeters are simpler devices, which study the viscosities for process monitoring and production, while high-precision rheometers are used more in science and research.

While the mere relative measurement of the viscosity is determined from the resulting rotational angle of a measuring element in relation to the rotational specification, wherein a spring couples the two axes of specification and measuring element to one another, more complex experimental procedures and specifications and the determination of additional measured values in defined geometries and distances/gap widths of the measuring elements are possible for the absolute value determination for high-accuracy rheometers. The determination of the Weissenberg effect from the normal force measurement and further parameters of the samples to be studied are thus possible.

It is generally true for the relative viscosimeters that the measuring elements used result in greater deflections and/or trailing of the measuring part in relation to the specification with rising circumference and higher rotational speed of the viscosimeter used for the measurement.

The users of simpler viscosimeters are typically not highly specialized operators and the process monitoring is carried out with the aid of known experimental setups. If those users are presented with the problem of measuring an unknown substance and/or a new batch or the sample changes very strongly over the course of the experiment, the procedure of determining the matching combination of measuring element geometry and experiment rotational speed by trial and error thus applies for them. At the same time, an array of measuring standards exists which specify "normalized" rotational speeds for the measurement of the materials for such relative measurements and further restrict the measuring elements usable for those methods.

In order to measure the viscosity of a liquid, in the case of rotation viscosimeters, a rotationally-symmetrical measuring element is immersed in the liquid and driven at constant rotational speed. The viscosimeter measures the torque required for the constant rotational speed or the effectuated angle deflection.

The viscosity of the sample is computed through the use of the respective known rotational speed, known properties of the measuring element, and measured torque or the measured angle deflection. The rheologist refers to an angle deflection "φ", which is measured in relation to the neutral position as the reference point or the rotational position of the motor axis.

In that case, the user selects, on the basis of their experience and/or the estimation of the viscosity to be expected of the sample, the rotational speed possibly matching with the sample liquid and the possibly matching measuring element. Inexperienced users often select the rotational speed which does not match and/or a measuring element which does not match.

In the case of excessively low rotational speeds or an excessively small measuring element, a usable torque or a usable angle deflection cannot be measured. In the case of excessively high rotational speeds or an excessively large measuring element, the torque sensor is at the mechanical stop (in saturation). In both cases, the measuring range of the torque sensor is not optimally utilized, since the highest accuracy of the measuring system, depending on the measuring element, is achieved in the range between 75% and 95% of the respective maximum measurable torque or maximum angle deflection.

SUMMARY OF THE INVENTION

It is accordingly an object of the invention to provide a rotation viscosimeter and a method for determining the viscosity of materials using a rotation viscosimeter, which overcome the hereinafore-mentioned disadvantages of the heretofore-known devices and methods of this general type and which assist a user in the selection of a suitable rotational speed and measuring element.

With the foregoing and other objects in view there is provided, in accordance with the invention, a method for determining the viscosity of materials using a rotation viscosimeter, which comprises providing a rotation viscosimeter including a measuring shaft driven by a drive, an, in particular elastic, coupling element having a maximum angle deflection and an optimum angle deflection, the optimum angle deflection being less than the maximum angle deflection, the measuring shaft being connected through the coupling element to the drive, and a measuring element, which is disposed at one end of the measuring shaft and to which a sample can be applied, an angle measuring unit is disposed in relation to the measuring shaft and is constructed in such a way that the angle deflection between the drive and the measuring shaft is measurable in the measuring mode, and an analysis unit, to which the angle deflection of the coupling element measured by the angle measuring unit is supplied, the optimum angle deflection of the coupling element being stored in the analysis unit or being supplied thereto before beginning the measurement, in a first step, the measuring element is immersed in a measuring container having a sample located therein,
in a second step, the rotational speed of the measuring shaft is increased proceeding from a first measuring point having an initial rotational speed, in particular a standstill, step-by-step to at least two further measuring points having respective rotational speeds and the respective angle deflection between the drive and the measuring shaft is determined in the individual measuring points,
in a third step, an estimation function is determined for the relationship between the rotational speed and the angle deflection for the sample using the measured values determined in the measuring points, in a fourth step, an optimum rotational speed is determined on the basis of the estimation function, at which a previously defined optimum angle deflection is present, and in a fifth step, the viscosity measurement of the sample is carried out, in particular at the optimum rotational speed.

This procedure results in better reproducible measurement results, more rapid selection/result formation in the rotational speed and measuring element selection, and lower susceptibility to error.

Maximum angle deflection is understood in conjunction with the present invention as the angle deflection at which the coupling element or the spring is maximally elongated, without being damaged, or the further elastic deformation of the coupling element is stopped on a stop. Optimum angle deflection is understood as the angle deflection of the coupling element at which the measurement error of the angle measuring unit is lowest. This is usually close to the maximum angle deflection thereof with the coupling elements being used.

A particularly small measuring error is effectuated by the optimum angle deflection being at least 75%, in particular greater than 80%, preferably greater than 85%, particularly preferably greater than 90% of the maximum angle deflection of the coupling element.

In order to assist the user in the selection of the suitable experimental setup, it can be provided that for the measurement of the viscosity of the sample, a number of measuring shafts and/or measuring elements is provided which each have optimum characteristics for respective samples having different viscosities, wherein an arbitrary first measuring shaft and/or measuring element is used for the first to third steps of the method, in the fourth step, the determined optimum rotational speed and/or the estimation function is compared to defined rotational speeds prescribed for the measurement, and the optimum measuring shaft and/or the optimum measuring element for the sample to be studied is determined on the basis of the characteristic of the measuring shafts and/or measuring elements, and the determined optimum measuring shaft is used for the measurement of the viscosity of the sample.

The accuracy of the measurement can be further improved by repeating the first to fourth method steps using the determined optimum measuring shaft and/or the optimum measuring element.

In order to be able to study a broad rotational speed range using a small number of measuring points, it can be provided that in the second step, the rotational speed of the measuring shaft is doubled proceeding from the first measuring point to the respective further measuring points having respective rotational speeds. This is preferably performed in the lower rotational speed range up to a deflection which results in a measurable deflection, for example: 10% of the maximum deflection of the coupling element or the spring.

In order to effectuate a defined advantageous starting point of the method, it can be provided that in the first or at the beginning of the second step, the angle deflection in the first measuring point is calibrated or reset to a defined value, in particular 0°.

The accuracy of the estimation function can be further increased by determining the respective angle deflection in each measuring point in the stationary state. The speed of the measurement can be increased by the estimation function also incorporating the chronological development of the measuring points in the estimation algorithm in addition to the rotational speed and the angle deflection and thus computing the prediction of the optimum rotational speed before reaching the stationary state of the spring deflection.

It can advantageously be provided that the estimation function is determined by subtraction of two measured values of the angle deflection and using an infinite impulse response filter or the estimation function is determined by using a recursive least square algorithm or a Kalman filter for parameter estimation.

The estimation function can furthermore advantageously be determined if, in the second step, the rotational speed is increased until a previously defined maximum angle deflection is present, wherein preferably the measurement is interrupted upon the presence of the maximum angle deflection.

It can optionally be provided that a number of model parameters and/or prediction models and/or calibration models determined on the basis of reference materials are used to determine the estimation function.

Any of the different rotation elements usable as measuring elements, for example, a cylinder, a disk, or also a paddle, can form a "channel" in difficult substances, for example, foams or waxes, etc. The respective measurement result or the measured torque therefore only provides limited information. By storing calibration data, such relationships between rotational speed, angle deflection, and torque can be better determined and/or predicted and the user can be warned before applying the results and/or assisted in the selection of correct experimental performances, for example, by selecting specific measuring element types, lowering the measuring elements into the sample during the measurement, etc.

This also applies similarly to thixotropic substances. These materials change the viscous properties thereof under shear, the structure thereof is often destroyed during the viscosity study, and the viscosity value thereof decreases. In such materials, the torque required for the movement decreases in inverse proportion to the duration of the shear due to the shear during the measurement. A particularly considered selection of the measuring elements and output of warnings to the user are also advantageous in this case.

It can advantageously be provided that a number of replaceable coupling elements and/or angle measuring units and/or rotation viscosimeters, each of which has optimum characteristics for samples having different viscosities, are provided for the measurement of the viscosity of the sample, wherein:

in the first step, an arbitrary first coupling element and/or an arbitrary first angle measuring unit and/or an arbitrary first rotation viscosimeter is used for the first to third and/or fourth step of the method, in the fourth step, the determined optimum rotational speed and/or the estimation function is compared to defined rotational speeds prescribed for the measurement, and on the basis of the characteristic of the coupling elements and/or angle measuring units, the optimum coupling element and/or the optimum angle measuring unit for the sample to be studied is determined and used for measuring the viscosity.

With the objects of the invention in view, there is concomitantly provided a rotation viscosimeter for carrying out the method according to the invention. The rotation viscosimeter has an analysis unit which is constructed and programmed in such a way that the method according to the invention can be carried out.

Other features which are considered as characteristic for the invention are set forth in the appended claims.

Although the invention is illustrated and described herein as embodied in a rotation viscosimeter and a method for determining the viscosity of materials using a rotation viscosimeter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
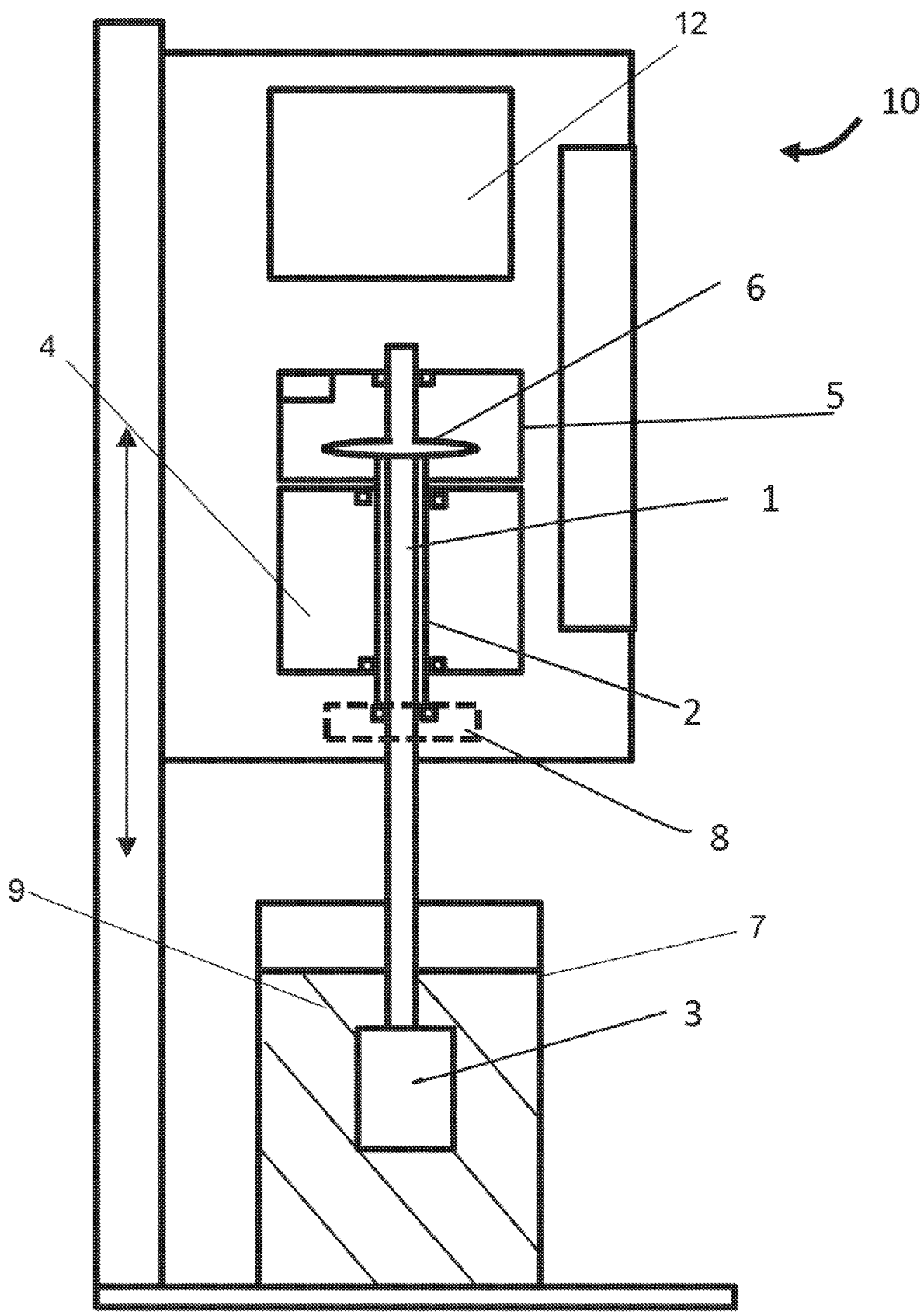
FIG. 1 is a diagrammatic, longitudinal-sectional view of an embodiment of the rotation viscosimeter according to the invention.

Referring now to the figures of the drawings in detail and first, particularly, to FIG. 1 thereof, there is seen an embodiment of a rotation viscosimeter 10 according to the invention. The rotation viscosimeter 10 includes a measuring shaft 1 and a hollow shaft 2 driven by a drive 4. This configuration is known from Austrian Patent Application AT A50255/2018. The hollow shaft 2 has a hollow shape and the measuring shaft 1 is disposed coaxially therein. A measuring element 3 is disposed at the end of the measuring shaft 1. One of the ends of the measuring shaft 1 and the hollow shaft 2, in this embodiment the upper end or the end opposite to the measuring element 3, respectively protrude into a housing 5. The housing 5 is connected to the hollow shaft 2 and rotates therewith. A coupling element 6 constructed as a spring is disposed in the housing 5. The spring is disposed between the housing 5 and the measuring shaft 1 and is fastened to each of them at one end. During the measurement, the measuring element 3 is immersed in a measuring cup 7 having a sample 9 and the hollow shaft 2 is driven by the drive 4. Due to the fastening of the spring on the measuring shaft 1 and the housing 5 and the fastening of the housing 5 on the hollow shaft 2, the spring is elongated by the resistance of the measuring element 3 in the sample 9 and its counter torque on the measuring shaft 1, when the hollow shaft 2 and/or the measuring shaft 1 is driven by the drive 4. The coupling element 6 or the spring has a special characteristic and has a maximum angle deflection $\varphi_{max}$. If the coupling element 6 or the spring is deformed beyond the maximum angle deflection $\varphi_{max}$, it can possibly be damaged or can no longer be completely deformed back elastically automatically. The optimum angle deflection $\varphi_{opt}$ of the coupling element 6 or the spring is the angle deflection of the coupling element at which the smallest measurement error occurs. This is usually specified by the producers of the viscosimeters and/or the coupling elements 6. The optimum angle deflection $\varphi_{opt}$ is always less than the maximum angle deflection $\varphi_{max}$.

The rotation viscosimeter 10 furthermore includes an angle measuring unit 8, which is disposed in relation to the measuring shaft 1 and constructed so that the angle difference and/or the angle deflection $\varphi$ between the hollow shaft 2 and the measuring shaft 1 is measurable in the measuring mode.

The rotation viscosimeter 10 furthermore includes an analysis unit 12. The rotational speed of the drive 4 can be regulated and/or controlled using the analysis unit 12 of the viscosimeter 10 and the measured values are supplied to the angle measuring unit 8.

The analysis unit 12 is supplied with the angle deflection $\varphi$ of the coupling element 6 measured by the angle measuring unit 8 and/or the measured values measured by the angle measuring unit 8. Furthermore, the optimum angle deflection $\varphi_{opt}$ of the coupling element 6 can be stored in the analysis unit 12 or it can be supplied to the analysis unit 12 before beginning the measurement.

In addition, different configurations for the mounting of the measuring shaft 1 and the measuring element 3 using precious-stone-tipped bearings, ball bearings, etc. are known to a person skilled in the art. Furthermore, the attachment of the coupling elements 6 and the rotational angle measurement unit 8 using single measuring shafts 1 or hollow shafts 2 is known and can be used for the method according to the invention. The configuration described in U.S. Pat. No. 2,679,750 or the configuration of the Applicant described in Austrian Patent AT 508705B1, corresponding to U.S. Pat. No. 9,261,446, are mentioned by way of example. In general, when carrying out the measurements of the viscosity over a broad viscosity measuring range, different rotation viscosimeters 10 having different characteristics of the coupling elements 6 are used.

Alternatively, the coupling element 6 can also be constructed as a torsion element. Thus, for example, the measuring shaft 1 can have a torsion wire, which is disposed in the axis of the measuring shaft 1 and experiences an elastic torsion in the measuring mode, and at the end at which it is connected to the housing 5. This torsion or twist can then be recorded by using strain gauges or other measuring sensors and used for the analysis.

Figure 3:
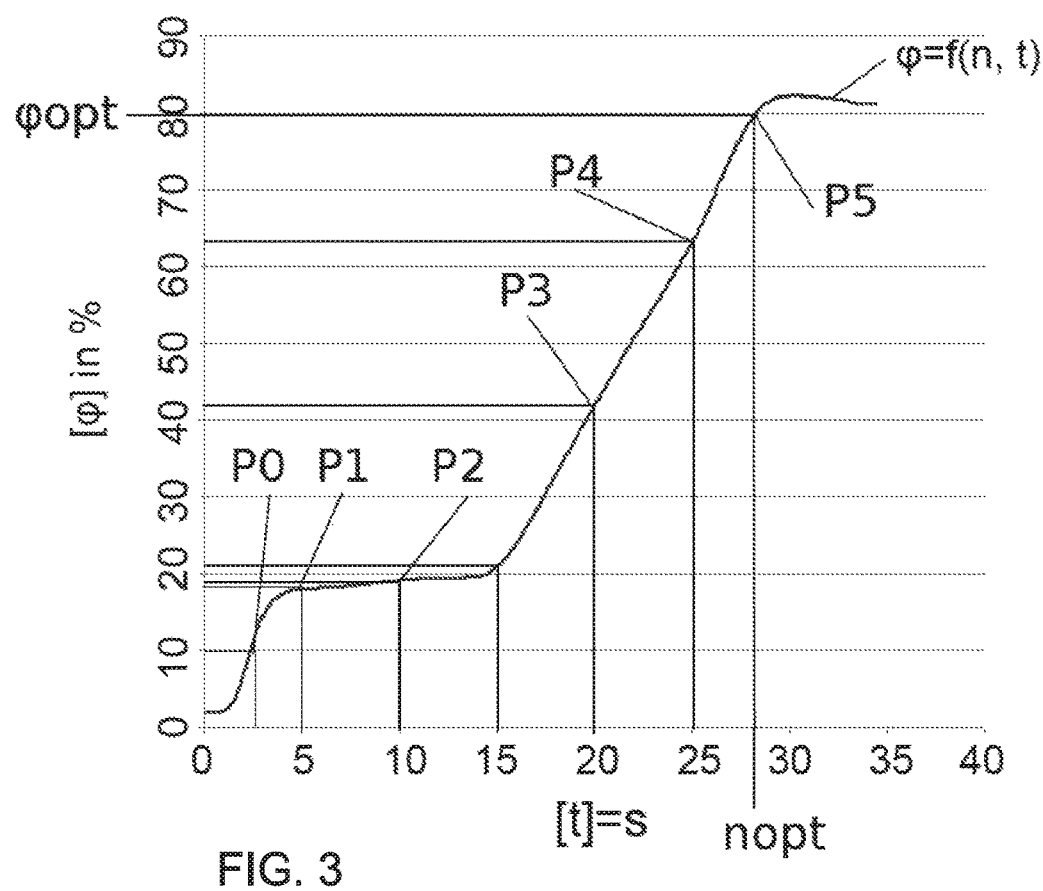
FIG. 3 and FIG. 4 are diagrams illustrating a curve of an embodiment of the method according to the invention.
Figure 4:
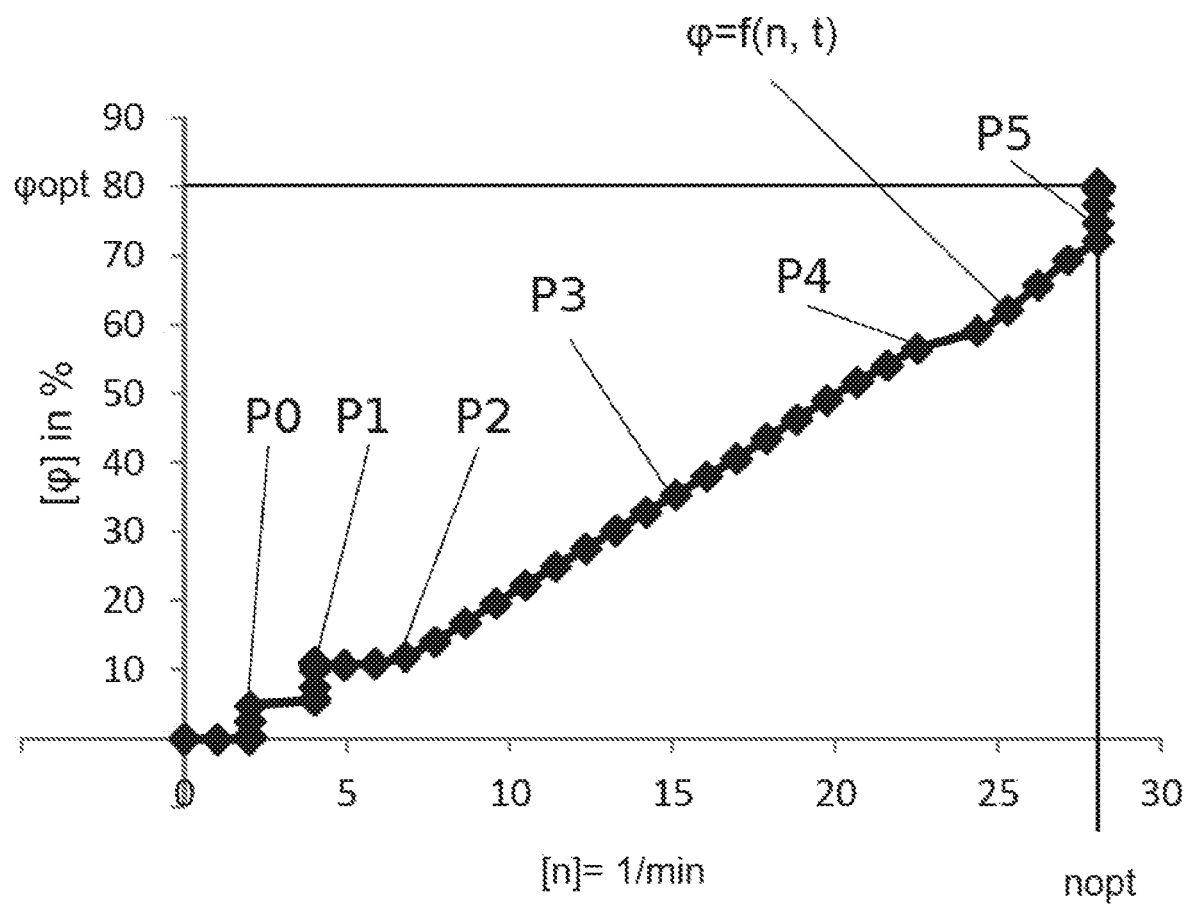

An embodiment of the method according to the invention will be described by way of example hereinafter on the basis of the diagrams of FIG. 3 and FIG. 4. In FIG. 3, the angle deflection $\varphi$ is plotted over time t, and in FIG. 4, the angle deflection $\varphi$ is plotted over rotational speed n.

Before beginning the measurement, the sample 9 is decanted into a measuring container 7 and positioned in a rotation viscosimeter 10 according to the invention. A measuring element 3 is attached to the measuring shaft 1 and positioned above the measuring container 7. In a first step, the measuring element 3 is immersed in the measuring container 7 and the sample 9 located therein. In a second step, the rotational speed n is then increased from a standstill and a first measuring point $P_0$ having a rotational speed $n_0$ is approached. After a settling procedure, i.e., when a stable angle deflection $\varphi$ is reached within defined accuracy, the angle deflection $\varphi_0$ is measured using the angle measuring unit 8 and the rotational speed n is increased in a second measuring point $P_1$. The rotational speed $n_1$ can in this case be twice that of the measuring point $P_0$, for example. Immediately after reaching the rotational speed $n_1$, the angle deflection $\varphi_1$ is measured. After the settling procedure in the point $P_1$, the angle deflection $\varphi_{1.1}$ is measured at the rotational speed $n_1$ in the measuring point P1. Proceeding from the measuring point P1, the rotational speed n is increased proceeding from the measuring point P1 further to a measuring point $P_2$ having a rotational speed $n_2$, for example, doubled. The measurement of the angle deflection $\varphi_2$ is then performed directly upon reaching the rotational speed $n_2$ or after the settling of the angle deflection φ, i.e., in the stationary state. The stationary or settled state can either be specified by specifying a fixed time interval for carrying out the measurement after reaching the respective rotational speed n or by determining the present angle deflection φ by way of the running measurement or individual measured values and specifying a threshold value. This procedure is then repeated for further measuring points $P_3$, $P_4$, and $P_5$.

In a third step, an estimation function φ=f(n, t) (FIG. 3) for the relationship between the rotational speed n and the angle deflection φ for the studied sample 9 is determined by the analysis unit 12 on the basis of the determined angle deflection $φ_0$, $φ_1$, $φ_2$, $φ_3$, $φ_4$, $φ_5$, ..., the rotational speeds $n_1$, $n_2$, $n_3$, $n_4$, $n_5$ ..., and/or on the basis of the measuring points $P_0$, $P_1$, $P_2$, $P_3$, $P_4$, $P_5$, .... The estimation function φ=f(n, t) then specifies the relationship between rotational speed n and angle deflection φ for the respective sample 9 studied using the specific measuring element 3. With the aid of the estimation function φ=f(n, t), in a fourth step, the optimum rotational speed $n_{opt}$ for the present measuring element 3 and the respective sample 9 is then determined.

Preferably, however, reaching the stationary state is not waited out in the individual measuring points $P_0$, $P_1$, $P_2$, $P_3$, $P_4$, $P_5$, ..., but rather the estimation function f(n)=φ already considers further or running measured values before reaching the stationary state. The model formation is thus performed in this case as φ=f(n, t) of the dynamic system. The measurement can thus be run through rapidly after the at least one initial value, which is measured in the stationary state, and the duration of the measurement can thus be reduced.

The torque applied to the drive 4 and/or the measuring shaft 1 is a function of the angle deflection φ and the spring constant of the coupling element 6 or the spring. Torque and rotational angle are linearly related for the coupling element 6 in this case. The optimum angle deflection $φ_{opt}$ is therefore as close as possible to 100% of the angle deflection φ, specified for the rotation viscosimeter 10 or the coupling element 6, since then the measured torque is as large as possible and therefore the relative error which arises during the measurement is least. An angle deflection φ of >75% is therefore desirable depending on the spring or coupling element 6, wherein the optimum angle deflection $φ_{opt}$ at the optimum rotational speed $n_{opt}$ is as large as possible, preferably greater than 80% (FIG. 3), optimally greater than 85% or 90% of the maximum angle deflection φ. In the exemplary embodiment shown in FIG. 3, the optimum angle deflection $φ_{opt}$ is 80%, i.e., at the end of the linear range, at a rotational speed of 28 rpm (FIG. 4).

In a fifth step, the actual angle deflection φ is then measured at the optimum rotational speed $n_{opt}$ determined on the basis of the estimation function φ=f(n, t) and the viscosity is computed from the measuring element parameters, the rotational speed n of the drive 4, and the torque or the angle deflection φ.

Since the spring or the coupling element 6 can be deflected during the insertion of the measuring element 3 into the rotation viscosimeter 10, the angle deflection φ can optionally be brought in the first step or in the measuring point $P_0$ to approximately or precisely 0°. For this purpose, for example, the angle deflection φ of the measuring axis 1 is measured in relation to the motor axis and a rotational speed n is determined which results in an angle deflection φ of 0° and, proceeding from this zero point, the method is then begun with the measurement of the angle deflection φ in this new measuring point $P_0$. Since dynamic components of the measuring element 3 can corrupt this computation, this step can be iterated as often as desired to obtain a still more accurate starting situation.

In a further optional embodiment of the method according to the invention for measuring the viscosity of the sample 9, a number of measuring shafts 1 and/or measuring elements 3 is provided to the measuring method. The measuring shafts 1 and measuring elements 3 each have different characteristics which provide optimum measuring results for respective different samples 9 having different viscosities. In the first step, an arbitrary measuring element 3 and/or an arbitrary measuring shaft 1 is installed on the rotation viscosimeter 10 and positioned above the sample 9. The first three method steps are then carried out using the first measuring shaft 1 and the first measuring element 3 as described above and the estimation function φ=f(n, t) and/or the optimum rotational speed $n_{opt}$ is determined by the analysis unit 12. The determined estimation function φ=f(n, t) and/or the determined optimum rotational speed $n_{opt}$ is then compared to the characteristic of the installed first measuring shafts 1 and the installed first measuring element 3 or the maximum rotational speeds $n_{max}$ thereof. It is then determined from the comparison whether the first measuring shaft 1 and/or the first installed measuring element 3 can execute the measurement for the present sample 9 in the preferred angle deflections $φ_{opt}$. If the optimum rotational speed $n_{opt}$ can be achieved for the sample 9 using the present measuring shaft 1 and the present measuring element 3, the viscosity is then approached at the optimum rotational speed $n_{opt}$ and the angle deflection φ is measured at this rotational speed. If it is established that the present measuring shaft 1 and the present measuring element 3 cannot execute the measurement of the viscosity of the sample 9 under the optimum conditions, the determined estimation function φ=f(n, t) and/or the determined optimum rotational speed $n_{opt}$ are then compared to the characteristics of the other measuring shafts 1 and measuring elements 3 in combination with the sample 9 and an optimum measuring element-sample and/or an optimum measuring shaft-sample combination 1 is determined for the sample 9 to be studied and communicated to the user. The viscosity of the sample 9 is then determined using the optimum measuring shaft 1 or the optimum measuring element 3 in the fifth step or the first to the fourth method steps are repeated until the optimum measuring shaft 1 and the optimum measuring element 3 have been found and the measurement of the viscosity of the sample 9 is carried out using these at the optimum rotational speed $n_{opt}$ and/or the optimum angle deflection $φ_{opt}$ and the measurement of the viscosity is then carried out in this measuring point.

The speed of the measurement can be increased by the estimation function φ=f(n, t), in addition to the rotational speed n and the angle deflection φ, also incorporating the chronological development of the measuring points into the estimation algorithm and thus computing the prediction of the optimum rotational speed $n_{opt}$ before reaching the stationary state of the deflection of the coupling element 6 or the spring.

Optionally, additionally or alternatively replaceable coupling elements 6 and/or replaceable angle measuring units 8 and/or multiple rotation viscosimeters 10 can be provided to the method and, on the basis of the determined estimation function φ=f(n, t), the optimum angle measuring unit 8 and/or the optimum coupling element 6 and/or a rotation viscosimeter 10 which is optimum or better suitable for the sample 9 can be recommended or displayed and the measurement of the viscosity can then be performed using them.

Alternatively, a warning can also be output or displayed to the user that the coupling element 6, the angle measuring unit 8, the rotation viscosimeter 10, the measuring shaft 1, and/or the measuring element 3 used will result in incorrect or inaccurate results.

In the method according to the invention, the rotational speed n can optionally be increased until a maximum spring deflection or maximum angle deflection $\varphi_{max}$ of 105% of the coupling element 6 is present or a stop is reached in the angle deflection $\varphi_{max}$. Upon the presence of this maximum angle deflection $\varphi_{max}$, the measurement can then be interrupted and a recommendation to install a different measuring shaft 1 or a different measuring element 3 is output.

It can alternatively be provided that it is determined on the basis of the method according to the invention whether the measurement can be examined in, for example, rotational speeds specified by a standard for the present sample 9 and then the optimum measuring shaft 1, the optimum measuring element 3, the optimum angle measuring unit 8, the optimum coupling element 6, and/or an optimum rotation viscosimeter 10 for these rotational speeds n and the present sample 9 are output or displayed.

The estimation function $\varphi=f(n, t)$ can be determined in the method according to the invention, for example, on the basis of the following options:

Thus, for example, the computation of the change of the deflection can be realized by using a subtraction of two measured values and subsequent second order "infinite impulse response filter" and the estimation function $\varphi=f(n, t)$ can be determined on the basis of the results.

Optionally, a time-discrete system model of low order can also be identified online in real time by using a recursive least square algorithm and the estimation function $\varphi=f(n, t)$ can be computed from its parameters. The measurement is then continued in further measuring points P and the computed estimation function $\varphi=f(n, t)$ is determined again until it is numerically stable, i.e., it remains constant in a defined range over a specific time span and further measuring points P and then the estimation function $\varphi=f(n, t)$ is confirmed and the method is continued.

Alternatively, for the estimation function $\varphi=f(n, t)$, a time-discrete system model of low order can also be identified online in real time by using a Kalman filter for parameter estimation and the estimation function $\varphi=f(n, t)$ can be computed from its parameters. As soon as this computed estimation function $\varphi=f(n, t)$ is numerically stable in further measuring points P, i.e., is in a defined range over a specific time span, the estimation function $\varphi=f(n, t)$ is confirmed and the method is continued.

In a further optional embodiment, additional tables, model parameters and/or values, calibration models, and functions of reference materials can also be stored for the method, which are also incorporated in the creation of the estimation function $\varphi=f(n, t)$.

Figure 2:
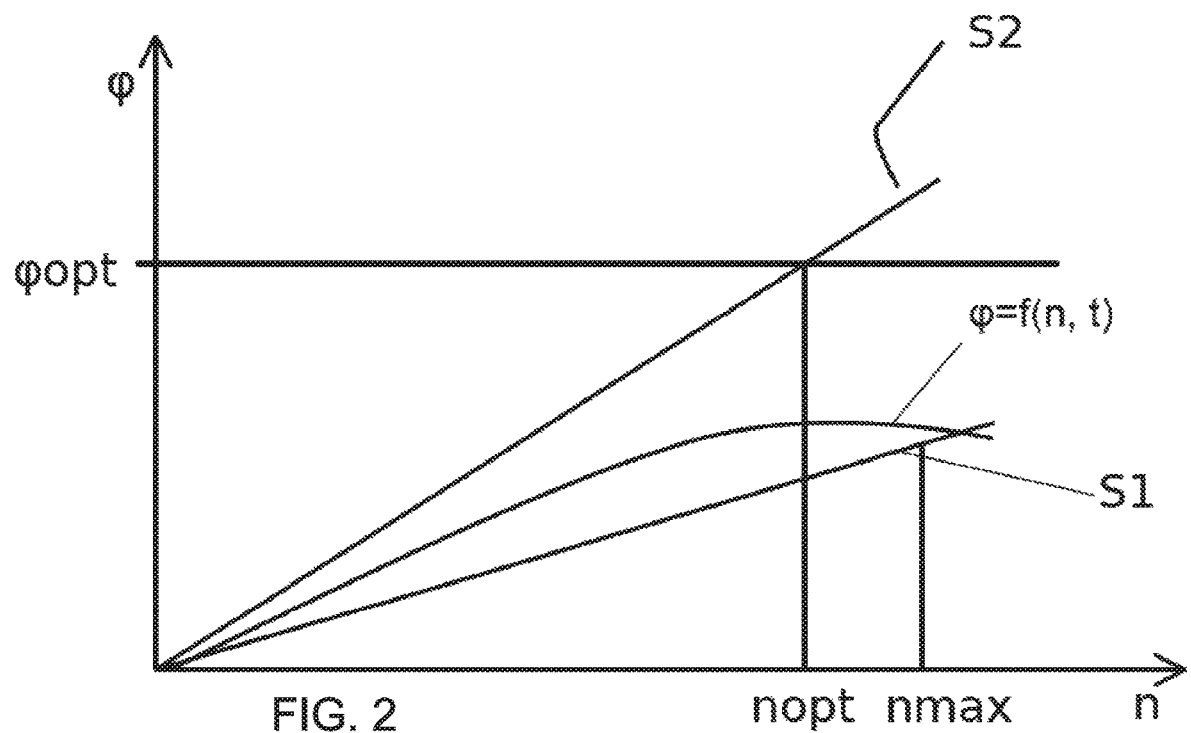
FIG. 2 is a diagram illustrating a selection of an estimation function.

The selection of a suitable measuring element 3 is shown in a diagram in FIG. 2. The rotation viscosimeter 10 or its coupling element 6 has an optimum angle deflection $\varphi_{opt}$. The behavior of the solely Newtonian sample 9 with the measuring element 3 and its characteristic S1 already has the result at low rotational speeds, on the basis of the determined estimation function $\varphi=f(n, t)$, that using this measuring element-sample combination, the optimum deflection of 95% of the maximum angle deflection $\varphi_{max}$ is not possible before reaching the highest permissible maximum rotational speed $n_{max}$.

A matching measuring element-rotational speed combination and/or the measuring element 3 having the best characteristic S2 for this sample 9 can be proposed for the present sample 9 and/or its viscosity from the relationship of the rotational speed n with the angle deflection $\varphi$ and the computation of the torque stored in the analysis unit 12. In this case, the measuring elements 3 available to the user can be taken into consideration. If an experimental procedure is not possible using the available measuring elements 3, measuring shafts 1, and rotational speeds n, the replacement of the rotation viscosimeter 10 or the coupling element 6 is recommended to the user.

FIG. 3 shows the time curve of the measuring points $P_0$, $P_1$, $P_2$, $P_3$, $P_4$, $P_5$, ... of an additional measurement using the proposed estimation function $\varphi=f(n, t)$. The respective angle deflection $\varphi$ is plotted over the time axis t to illustrate the values. According to the invention, the rotational speed n is doubled from zero in this case until an angle deflection $\varphi$ of approximately 10% is reached in the measuring point $P_0$. This measured value is preferably determined in this case with greater accuracy, the angle deflection $\varphi_0$ is thus determined in the settled stationary state. From there, the further rotational speed range can be passed through with rapid increase of the rotational speed n, above all upon the presence of strictly Newtonian behavior of the studied liquid and/or sample 9.

In one preferred embodiment, the method or the estimation function $\varphi=f(n, t)$ and the measuring points P or the value pairs for the rotational speed n and the angle deflection $\varphi$ are also carried out without reaching the stationary state. Upon reaching the optimum rotational speed $n_{opt}$, many measuring points P are then again determined to determine the stationary angle deflection $\varphi$ of the coupling element 6 and thus the torque sufficiently accurately. Alternatively, the measurement can also be ended in this case and the optimum parameters for carrying out the measurement can be displayed to the user without actual measurement.

In a further embodiment, for the creation of the estimation function $\varphi=f(n, t)$, the liquid is characterized according to its static viscosity and at the same time a differentiation is made between, for example, structurally viscous, dilatant, and Newtonian liquids. For this purpose, for example, the recursive least square algorithm is expanded by an "exponential forgetting" having short time constant, which prefers more chronologically up-to-date values. During the execution of the individual steps in the method according to the invention, on the basis of the measurement data of the rotational speed n and the angle deflection $\varphi$, the dynamic transmission function is computed, from the coefficients of which the amplification in the settled state is estimated and a measuring point is generated therefrom on the static shear speed-shear tension characteristic curve. The characteristic of the viscosity is determined by the analysis unit 12 from the curve of this characteristic curve. For this purpose, the change of the slope between the measuring points is observed. In the case of positive change, a dilatant liquid is concluded, in the case of negative change, a structurally viscous liquid, and in the case of no or linear change, a Newtonian liquid is concluded and the characteristic is then taken into consideration in the creation of the estimation function $\varphi=f(n, t)$.

In a further embodiment, the shear speed-shear tension characteristic curve can be approximated or extrapolated after several measuring points P by a low-order polynomial and the rotational speed value n can be computed for the optimum shear tension or angle deflection $\varphi$. Optionally and/or additionally thereto, the calibration curves using model substances can be stored for the respective behavior with various measuring elements and the optimum combination of the experimental procedure can be predicted and/or proposed from the determined estimation function φ=f(n, t) with the aid of the calibration curves using different measuring elements 3.

The invention claimed is:

1. A method for determining viscosity of materials, the method comprising the following steps:
provicing a rotation viscosimeter including a measuring shaft, a drive driving the measuring shaft, an elastic or non-elastic coupling element having a maximum angle deflection and an optimum angle deflection being less than the maximum angle deflection, the measuring shaft being connected through the coupling element to the drive, and a measuring element to be applied to a sample and being disposed at one end of the measuring shaft;
providing the rotation viscosimeter with an angle measuring unit disposed relative to the measuring shaft and constructed to permit an angle deflection between the drive and the measuring shaft to be measured in a measuring mode;
providing the rotation viscosimeter with an analysis unit receiving the angle deflection of the coupling element measured by the angle measuring unit and storing or receiving the optimum angle deflection of the coupling element before beginning a measurement;
in a first step, immersing the measuring element in a measuring container having the sample located therein;
in a second step, increasing a rotational speed of the measuring shaft proceeding from a first measuring point at an initial rotational speed or a standstill, step-by-step to at least two further measuring points having respective rotational speeds and determining a respective angle deflection between the drive and the measuring shaft for each of the at least two measuring points;
in a third step, determining an estimation function for a relationship between the rotational speed and the angle deflection for the sample using measured values determined at the at least two measuring points;
in a fourth step, determining an optimum rotational speed based on the estimation function, at which a previously defined optimum angle deflection is present; and
in a fifth step, carrying out a viscosity measurement of the sample at the optimum rotational speed.

2. The method according to claim 1, which further comprises setting the optimum angle deflection to be at least 75%, or greater than 80%, or greater than 85%, or 90% of the maximum angle deflection of the coupling element.

3. The method according to claim 1, which further comprises:
using a plurality of at least one of measuring shafts or measuring elements, each having optimum characteristics for respective samples having different viscosities;
using at least one of an arbitrary first measuring shaft or measuring element for carrying out the first, second and third steps;
in the fourth step, comparing at least one of the determined optimum rotational speed or the estimation function to defined rotational speeds prescribed for the measurement, and determining at least one of an optimum measuring shaft or an optimum measuring element for the sample to be examined based on a characteristic of at least one of the measuring shafts or measuring elements for at least one of a present sample or previously measured reference liquids; and
using the determined optimum measuring shaft for the viscosity measurement of the sample in the fifth step.

4. The method according to claim 3, which further comprises repeating the first, second, third and fourth steps using at least one of the determined optimum measuring shaft or the optimum measuring element.

5. The method according to claim 1, which further comprises in the second step, doubling the rotational speed of the measuring shaft proceeding from the first measuring point to respective further measuring points at respective rotational speeds.

6. The method according to claim 1, which further comprises in the first step or at a beginning of the second step, calibrating or resetting the angle deflection in the first measuring point to a defined value or to 0°.

7. The method according to claim 1, which further comprises determining the respective angle deflection in each measuring point in a stationary state.

8. The method according to claim 1, which further comprises determining the estimation function by subtraction of two measured values of the angle deflection and use of an infinite impulse response filter.

9. The method according to claim 1, which further comprises determining the estimation function by using a recursive least square algorithm or a Kalman filter for parameter estimation.

10. The method according to claim 1, which further comprises in the second step, increasing the rotational speed until a previously defined maximum angle deflection is present.

11. The method according to claim 10, which further comprises interrupting the second step upon a presence of the maximum angle deflection.

12. The method according to claim 1, which further comprises using a plurality of at least one of model parameters or prediction models or calibration models determined on a basis of reference materials to determine the estimation function.

13. The method according to claim 1, which further comprises:
measuring the viscosity of the sample by using a plurality of at least one of replaceable coupling elements or angle measuring units or rotation viscosimeters each having different optimum angle deflections, each having optimum characteristics for samples having different viscosities, and storing or receiving the respective optimum angle deflection of the coupling element in the analysis unit or the respective analysis unit before beginning the measurement;
in the first step, using at least one of an arbitrary first coupling element or an arbitrary first angle measuring unit or an arbitrary first rotation viscosimeter for at least one of the first, second and third steps or the fourth step;
in the fourth step, comparing at least one of the determined optimum rotational speed or the estimation function to defined rotational speeds prescribed for the measurement; and
determining or using at least one of the optimum coupling element or the optimum angle measuring unit for the sample to be studied for measuring the viscosity based on at least one of the characteristic of the coupling elements or angle measuring units.

14. A rotation viscosimeter for measuring viscosity of materials, the rotation viscosimeter comprising:

an elastic or non-elastic coupling element or spring having a maximum angle deflection and an optimum angle deflection being less than the maximum angle deflection;

a drive;

a measuring shaft driven by said drive and connected through said coupling element to said drive;

a measuring element to be applied to a sample, said measuring element being disposed at an end of said measuring shaft;

an angle measuring unit being disposed relative to said measuring shaft and constructed for measuring an angle deflection between said drive and said measuring shaft in a measuring mode;

an analysis unit for receiving an angle deflection of said coupling element measured by said angle measuring unit and for storing or receiving the optimum angle deflection of said coupling element before beginning a measurement; and the rotation viscosimeter and said analysis unit being constructed and programmed to carry out the following steps:

in a first step, immersing the measuring element in a measuring container having the sample located therein;

in a second step, increasing a rotational speed of said measuring shaft proceeding from a first measuring point at an initial rotational speed or a standstill, step-by-step to at least two further measuring points having respective rotational speeds and determining a respective angle deflection between said drive and said measuring shaft for each of the at least two measuring points;

in a third step, determining an estimation function for a relationship between the rotational speed and the angle deflection for the sample using measured values determined at the at least two measuring points;

in a fourth step, determining an optimum rotational speed based on the estimation function, at which a previously defined optimum angle deflection is present; and in a fifth step, carrying out a viscosity measurement of the sample at the optimum rotational speed.

* * * * *